(12) United States Patent
Benda

(10) Patent No.: US 7,207,198 B2
(45) Date of Patent: Apr. 24, 2007

(54) VALVE LOCKOUT ASSEMBLY

(75) Inventor: Steven J. Benda, Cokato, MN (US)

(73) Assignee: Brady Worldwide, Inc., Milwaukee, WI (US)

( * ) Notice: Subject to any disclaimer, the term of this patent is extended or adjusted under 35 U.S.C. 154(b) by 150 days.

(21) Appl. No.: 10/927,797

(22) Filed: Aug. 27, 2004

(65) Prior Publication Data

US 2006/0042332 A1    Mar. 2, 2006

(51) Int. Cl.
*F16K 35/00* (2006.01)

(52) U.S. Cl. .............................. 70/19; 70/177; 70/180; 70/203; 70/212; 137/385

(58) Field of Classification Search .......... 70/175–180, 70/19, 202, 203, 211, 212; 137/385
See application file for complete search history.

(56) References Cited

U.S. PATENT DOCUMENTS

| | | | | |
|---|---|---|---|---|
| 209,181 | A | * | 10/1878 | Miller .................... 292/307 B |
| 489,329 | A | * | 1/1893 | Rosse ......................... 220/291 |
| 812,021 | A | * | 2/1906 | Dahl .......................... 70/180 |
| 2,099,869 | A | | 11/1937 | Stainbrook |
| 2,578,547 | A | * | 12/1951 | Hilger ......................... 74/566 |
| 3,006,181 | A | * | 10/1961 | Sarti .......................... 70/180 |
| 3,156,256 | A | * | 11/1964 | Weaver ...................... 137/385 |
| 3,532,111 | A | * | 10/1970 | Gaglio et al. ............... 137/385 |
| 3,765,197 | A | * | 10/1973 | Foote .......................... 70/58 |
| 4,162,690 | A | * | 7/1979 | Anderson ................... 137/385 |
| 4,777,809 | A | * | 10/1988 | Wiggins ....................... 70/57 |
| 4,848,724 | A | * | 7/1989 | Pettinaroli ................... 251/95 |
| 5,003,797 | A | | 4/1991 | Wirth et al. |
| 5,092,359 | A | | 3/1992 | Wirth et al. |
| 5,415,017 | A | | 5/1995 | Benda et al. |
| 5,664,447 | A | | 9/1997 | Neeley |
| 5,950,462 | A | | 9/1999 | Neeley |
| 6,038,893 | A | | 3/2000 | Neeley et al. |
| 6,070,442 | A | | 6/2000 | Neeley et al. |
| 6,205,826 | B1 | | 3/2001 | Neeley |

(Continued)

OTHER PUBLICATIONS

European Search Report dated Apr. 19, 2006.

*Primary Examiner*—Lloyd A. Gall
(74) *Attorney, Agent, or Firm*—Quarles & Brady LLP (57) ABSTRACT

A lockout assembly suitable for use with a valve having a handle rotatable between an open position and a closed position includes a lock arm which supports a clamping mechanism. In one aspect of the invention, the lock arm includes a longitudinal slot having slot ends. The clamping mechanism is engagable with the handle for clamping thereto and includes a threaded stud extending through the slot. The threaded stud is slidable in the slot between the slot ends. In another aspect of the invention, the clamping mechanism includes a locking knife and body. The body is interposed between the lock arm and locking knife, and includes an opening for slidably receiving the threaded stud therethrough. The locking knife is axially fixed to an end of the threaded stud and is moveable relative to the body for clamping onto the handle interposed between the locking knife and body. The locking knife includes a lower jaw having a distal end and a proximal end. The proximal end is connected to the threaded stud by a sidearm offset from an axis defined by the threaded stud to allow the handle to slip between the lower jaw and body over the distal end of the lower jaw.

38 Claims, 12 Drawing Sheets

U.S. PATENT DOCUMENTS

| | | |
|---|---|---|
| 6,209,365 B1 | 4/2001 | Neeley |
| 6,324,877 B2 | 12/2001 | Neeley |
| 6,382,001 B1 | 5/2002 | Neeley et al. |
| 6,622,536 B1 * | 9/2003 | Fuller et al. .................. 70/177 |
| 2003/0024284 A1 * | 2/2003 | Erickson ..................... 70/177 |
| 2003/0164011 A1 | 9/2003 | Fuller et al. |

* cited by examiner

VALVE LOCKOUT ASSEMBLY

CROSS REFERENCES TO RELATED APPLICATIONS

Not Applicable.

STATEMENT REGARDING FEDERALLY SPONSORED RESEARCH

Not Applicable

BACKGROUND OF THE INVENTION

The field of invention is devices which preclude unauthorized operation of a valve; and more particularly to a device which attaches to a handle which operates the valve and inhibits movement of that handle.

A ball valve is a common type of mechanism for controlling the flow of a fluid through a pipeline. Such a valve has a housing with an inlet opening and an outlet opening to which sections of the pipeline are attached. Within the housing is a ball that has an aperture therethrough. The ball is attached to one end of a stem which extends through an opening in the housing and has a handle attached to the exterior end of the stem. The user is able to rotate the handle causing a corresponding rotation of the ball inside the valve housing. In a first orientation of the ball, the aperture therethrough is aligned with the inlet and outlet openings allowing the fluid to flow through the valve. When the handle is rotated ninety degrees from the first orientation, the aperture through the ball no longer is aligned with the inlet and outlet openings, instead a solid portion of the ball blocks fluid flow through the valve. The handle and the attached ball can be placed at other positions between the fully opened and fully closed orientations to throttle the flow of fluid through the valve.

In many applications of a ball valve, it is desirable to prevent unauthorized operation. Therefore, a locking mechanism is required to preclude moving the valve handle from the fully closed position without appropriate authorization. For example, when maintenance is being performed on equipment downstream from the valve, it is often necessary to lock the valve in a closed state to prevent someone from inadvertently opening the valve, thereby releasing hazardous energy resulting in harm to personnel or equipment.

Known valve lockout assemblies, such as disclosed in U.S. Pat. No. 5,415,017 which is assigned to the assignee of the invention disclosed herein and fully incorporated herein by reference, have proven very successful in the market. These prior art assemblies, however, require assembly proximal the point of use and are difficult to install onto a valve handle. Accordingly, a need exists for a simple valve lockout assembly that does not require assembly at proximal the point of use and is easy to install onto a valve handle.

BRIEF SUMMARY OF THE INVENTION

The present invention provides a lockout assembly suitable for use with a valve having a handle rotatable between an open position and a closed position. In one aspect of the invention, the assembly includes a lock arm including a longitudinal slot having slot ends. A clamping mechanism engagable with the handle for clamping thereto includes a threaded stud extending through the slot. The threaded stud is slidable in the slot between the slot ends. In another aspect of the invention, the clamping mechanism includes a locking knife and body. The body is interposed between the lock arm and locking knife, and includes an opening for slidably receiving the threaded stud therethrough. The locking knife is axially fixed to an end of the threaded stud and is moveable relative to the body for clamping onto the handle interposed between the locking knife and body. The locking knife includes a lower jaw having a distal end and a proximal end. The proximal end is connected to the threaded stud by a sidearm offset from an axis defined by the threaded stud to allow the handle to slip between the lower jaw and body over the distal end of the lower jaw.

A general objective of the present invention is to provide a valve lockout assembly including a lock arm and clamping mechanism in which the clamping mechanism can be installed onto a handle of the valve without the lock arm interfering. This objective is accomplished by providing a lock arm having a slotted opening through which the clamping assembly is fixed thereto. The slotted opening allows the lock arm to be moved out of the way as the clamping assembly engages the valve handle.

Another objective of the present invention is to provide a clamping mechanism forming part of a valve lockout assembly that can be easily slipped onto a handle of a valve. This objective is accomplished by providing a clamping assembly in which the handle can be slipped laterally between clamping members, such as a lower jaw of a lock knife and the jaws of a body.

Yet another objective of the present invention is to provide a lock assembly that can lock out a valve using a cable. This objective is accomplished by incorporating a cable lockout assembly into the clamping mechanism.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Referring to FIGS. 1–6, a valve lockout assembly 10 for locking a rotatable handle 12 of a valve 14 includes a lock arm 16 that supports a clamping mechanism 18. The valve 14 can be any type of valve having a rotatable handle 12 that is rotatable between an open position and a closed position. In the following description, the handle 12 is a lever handle that rotates approximately 90° to move between an open position and a closed position. However, any type of handle 12 engagable by the clamping mechanism 18, such as round, or wheel, that requires rotation of greater than 360° to move between an open position and a closed position, can be locked out by the present invention.

The lock arm 16 includes a metal plate 20 extending between an engagement end 22 and a support end 24. A central slotted opening 26 formed in the plate 20 extends from the support end 24 towards the engagement end 22 between slot ends 28, 30. A material 32, such as plastic, rubber, and the like, overmolded onto the engagement end 22 covers a portion of the plate 20, and includes a projection 34 in the shape of a hook that engages the valve 14, or pipeline 36 controlled by the valve 14, to prevent rotation of the handle 12. Locking ribs 38, 40 formed on an upper surface 42 and lower surface 44 of the lock arm 16 on both sides of the slotted opening 26 engage the clamping mechanism 18 to prevent movement of the clamping mechanism 18 toward either of the lock arm ends 22, 24 when the clamping mechanism 18 is locked onto the lock arm 16.

The clamping mechanism 18 clamps onto the handle 12 to prevent the handle 12 from rotating between the open and closed position. In the embodiment shown in FIGS. 1–8, the clamping mechanism 18 includes a threaded stud 48 extending through the slotted opening 26 formed in the lock arm 16. A lower end 50 of the threaded stud 48 is axially fixed to a locking knife 54 which interacts with a body 56 to clamp the handle 12 therebetween. The body 56 is interposed between the lock arm 16 and locking knife 54. An upper end 52 of the threaded stud 48 threadably engages a hand wheel 58 to axially move the locking knife 54 relative to the body 56 to clamp the handle 12 therebetween. A locking cleat 60 interposed between the hand wheel 58 and lock arm 16 engages the lock arm 16 to lock the clamping mechanism 18 relative to the lock arm 16. The locking mechanism fixed relative to the lock arm 16 engages the hand wheel 58 to prevent rotation of the hand wheel 58, and thus axial movement of the locking knife 54, when locking out the valve 14.

The threaded stud 48 is an elongated shaft having an outer surface 62 extending between the upper end 52 and the lower end 50. Threads 66 formed on the outer surface 62 extend from the upper end 52 toward the lower end 50 and threadably engage the hand wheel 58. Advantageously, the threaded stud 48 is slidably received in the lock arm slotted opening 26, and can slide axially through the slotted opening 26 and transversely between the slot ends 28, 30 toward either lock arm end 22, 24 to simplify installation of the valve lockout assembly 10 onto the valve 14.

An anchor plate 116 fixed to the lower end 50 of the threaded stud 48 forms a T-shape that is received in a slot 114 formed in the locking knife 54 to axially fix the threaded stud 48 to the locking knife 54. The anchor plate 116 can be fixed to the threaded stud lower end 50 using any methods known in the art, such as welding, screws, and the like, without departing from the scope of the invention. Moreover, the anchor plate 116 can be formed as an integral part of the threaded stud 48, or form part of a screw insert that threadably engages the threaded stud threads 66, without departing from the scope of the invention.

The body 56 includes a top wall 70 having downwardly extending and joined side walls 72 and end walls 74. The side and end walls 72, 74 define a cavity 64 that slidably receives the locking knife 54. An aperture 78 formed through the top wall 70 slidably receives the threaded stud 48. A locking disc 80 molded into the top wall 70 includes locking ribs 82 that mesh with the locking ribs 40 formed in the lower surface 44 of the lock arm 16 to lock the body 56 relative to the lock arm 16.

A pair of jaws 86 having downwardly extending teeth 88 extend downwardly from each side wall 72 for engaging the handle 12. Preferably, each jaw 86 includes a lower edge formed from a stainless steel metal plate 90. A material 92, such as plastic, rubber, and the like, is overmolded onto the metal plates 90 to form the side walls 72. Preferably, the material 92 is overmolded onto the metal plates 90 in a mold that also forms the end walls 74 and top wall 70 of the body 56 as a single piece.

The locking knife 54 is fixed to the lower end 50 of the threaded stud 48 and cooperates with the body 56 to clamp the handle 12 therebetween. The locking knife 54 includes a lower jaw 96 having upwardly extending teeth 98 extending between a proximal end 100 and a distal end 102. The proximal end 100 of the lower jaw 96 is fixed to an upper bracket 104 by a sidearm 106 that is offset from an axis 108 defined by the threaded stud 48, and extends between the lower jaw 96 and upper bracket 104. Advantageously, by fixing the lower jaw 96 to the upper bracket 104 by a sidearm 106 that is offset from the axis 108 defined by the threaded stud 48, the handle 12 can be slipped between the lower jaw 96 and body 56 over the lower jaw distal end 102 to simplify mounting the valve lockout assembly 10 onto the valve 14.

In a preferred embodiment, the lower jaw 96, sidearm 106, and upper bracket 104 are formed from a single piece of stainless steel metal plate, such as by stamping. The slot 114 formed in the upper bracket 104 receives the anchor plate 116 fixed to the lower end 50 of the threaded stud 48. A plurality of holes 118 formed through the metal plate are used to align the metal plate in a mold and receive overmolded material therethrough to securely fix the overmolded material to the metal plate. The material is overmolded onto the metal plate and anchor plate 116 in the slot 114 to fix the lower end 50 of the threaded stud 48 to the upper bracket 104 and provide the locking knife 54 with a pleasing appearance.

The locking knife 54 is axially moved relative to the body 56 by the hand wheel 58 threadably engaging the threaded stud 48. The locking cleat 60 is interposed between the lock arm 16 and hand wheel 58 locking the hand wheel 58 relative to the lock arm 16. A pair of tabs 120 extending from the locking cleat 60 receive the shackle of a padlock, or other locking mechanism, to rotatably lock the hand wheel 58. Rotatably locking the hand wheel 58 prevents an unauthorized user from rotating the hand wheel 58 and disengaging the locking knife 54 and body 56 from the valve handle 12.

The locking cleat 60 has a disk portion 122 with a centrally located aperture 124 through which the threaded stud 48 extends. The aperture 124 in the disk portion 122 is larger than the outer diameter of the threaded stud 48 so that the threaded stud 48 is able to slide axially unobstructed through the locking cleat 60. A lower surface 126 of the disk portion 122 includes locking ribs 128 that mesh with the locking ribs 38 formed on the upper surface 42 of the lock arm 16 so that when the lower surface 126 of the locking cleat 60 is forced against the upper surface 42 of the lock arm 16, the intermeshing locking ribs 38, 128 restrict relative movement between the locking cleat 60 and lock arm 16.

Inner and outer tubes 132, 134 of the locking cleat 60 extend upward from the disk portion 122 and both tubes 132, 134 are coaxial with the aperture 124 through the disk portion 122. The pair of tabs 120 extend horizontally outward in diametrically opposite directions from an upper end of the outer tube 134. Each of the tabs 120 has an aperture 136 therethrough for receiving the shackle of a padlock.

Figure 1:
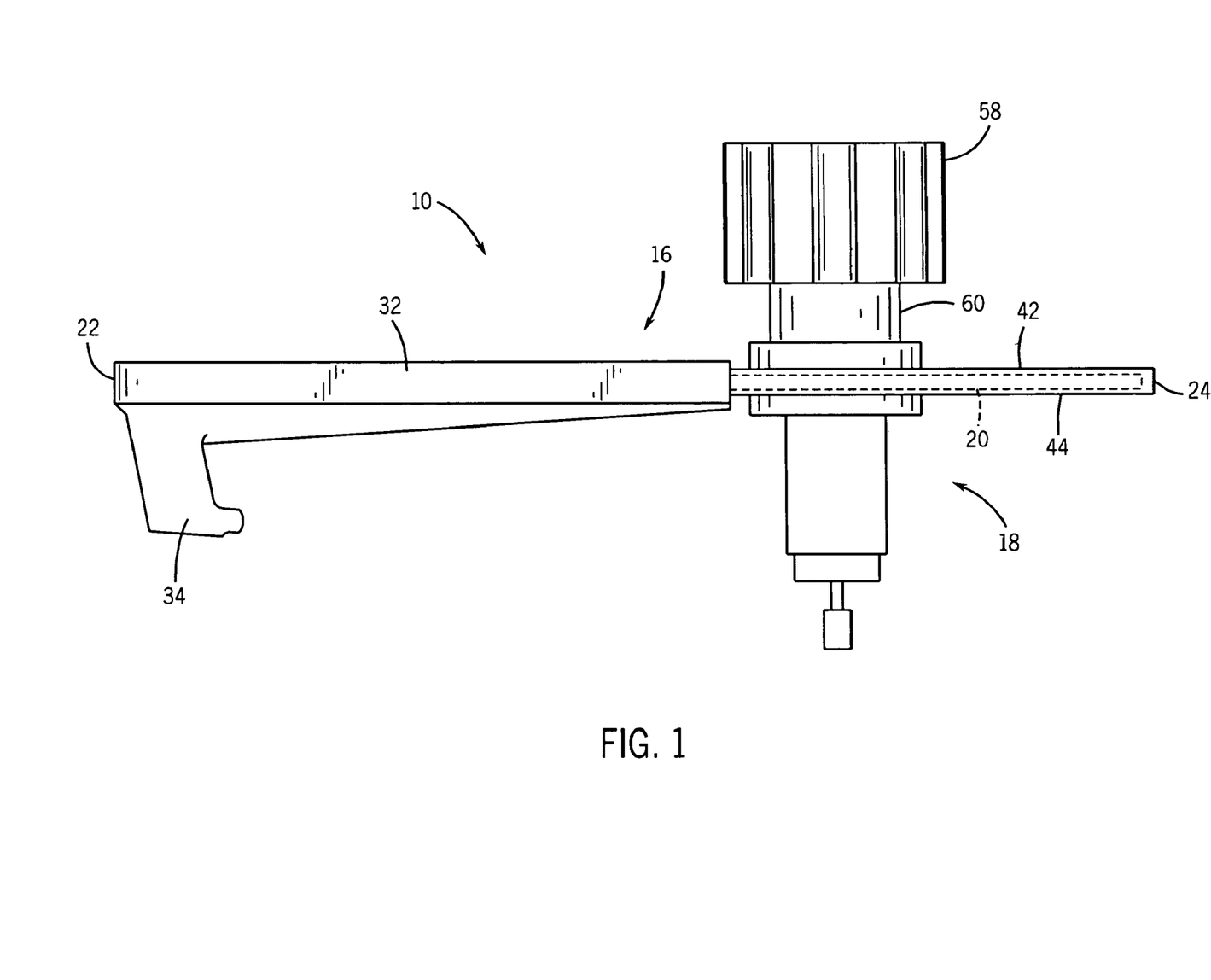
FIG. 1 is a side view of a valve lockout assembly incorporating the present invention.
Figure 2:
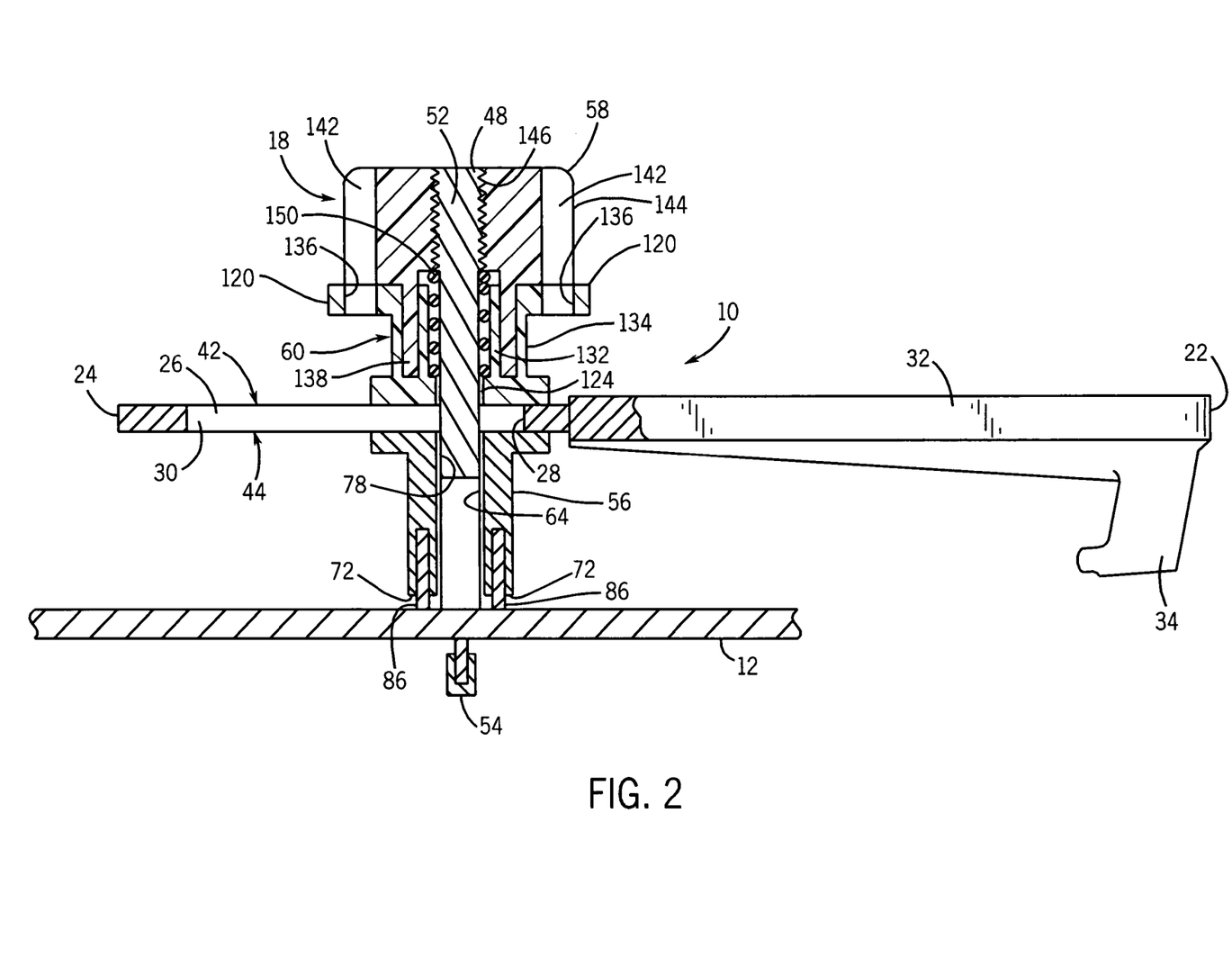
FIG. 2 is a partial cut away sectional view of the valve lockout assembly of FIG. 1 clamped onto a valve handle.
Figure 3:
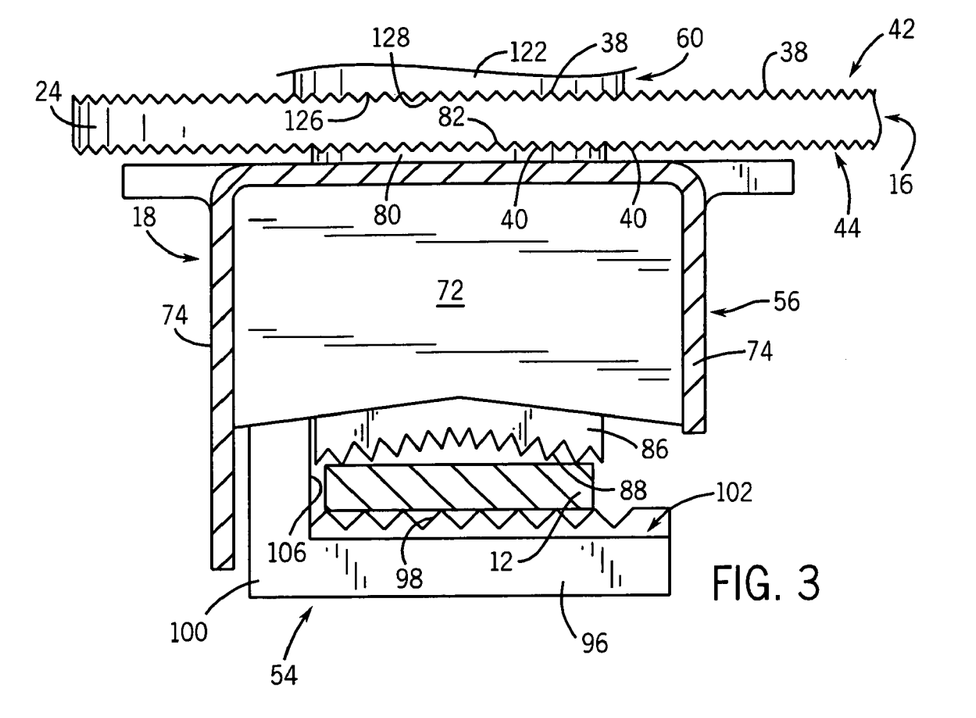
FIG. 3 is a detailed side view of a lower portion of the clamping mechanism of FIG. 2 rotated 90°.
Figure 4:
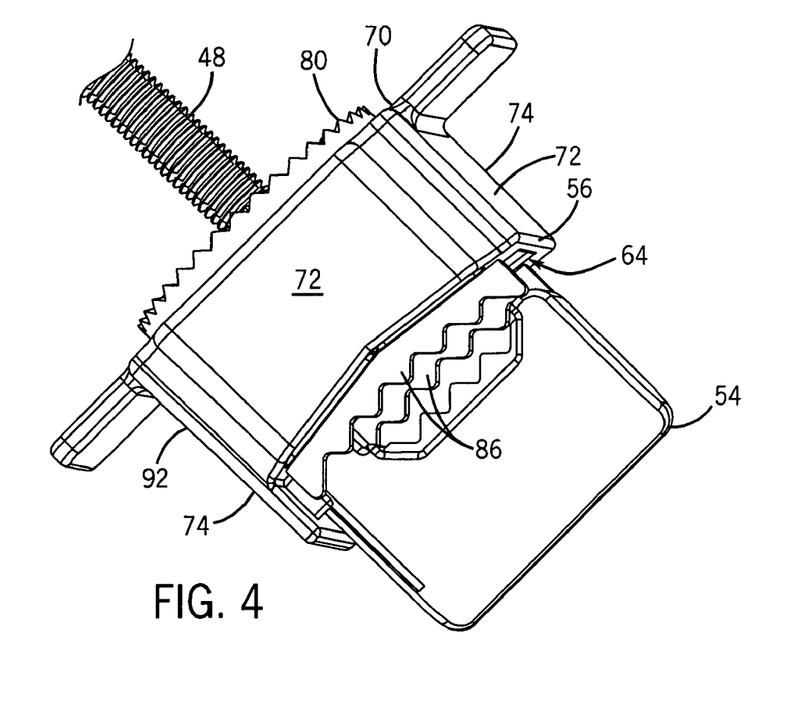
FIG. 4 is a perspective view of the lower portion of the clamping mechanism of FIG. 2 disassembled from the upper portion of the clamping mechanism.
Figures 5, 6:
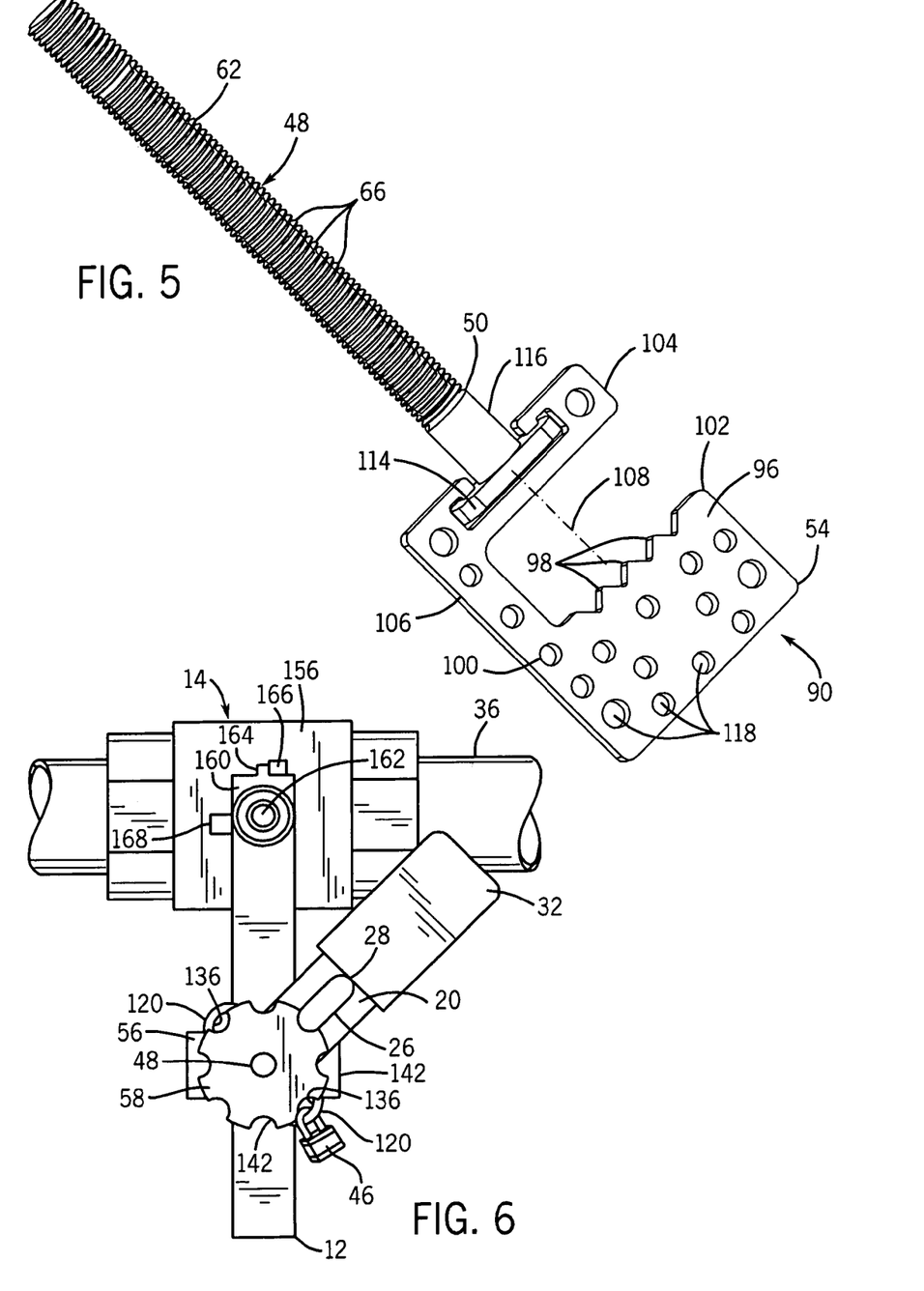
FIG. 5 is a perspective view of the locking knife, threaded insert, and threaded stud of FIG. 4 prior to overmolding material thereon.
FIGS. 6–8 are top views of the valve lockout assembly of FIG. 1 showing different stages of installing the valve lockout assembly onto a valve handle of a valve installed in a pipeline.

The hand wheel 58 has a tubular projection 138 that extends in between the inner and outer tubes 132, 134 of the locking cleat 60 and is slidable therein. As shown in FIGS. 1 and 6, the hand wheel 58 has a generally circular shape with a plurality of notches 142 extending longitudinally in the outer circumferential surface 144 of the hand wheel 58. These notches 142 not only provide a gripping surface for the uses of the valve lockout assembly 10, but also receive the shackle of the padlock inserted through aperture 136 in one of the tabs 120 on the locking cleat 60. The hand wheel 58 has a centrally located threaded aperture 146 that engages the thread on the threaded stud 48 so that the hand wheel 58, upon being rotated, moves along the threaded stud 48. A compression spring 150 is positioned around the threaded stud 48 within the inner tube 132 of the locking cleat 60. Rotation of the hand wheel 58 on threaded stud 48 in one direction compresses the spring 150 and in the opposite direction allows the spring 150 to expand. Thus, the spring 150 biases the hand wheel 58 away from the locking cleat 60 so as to draw the locking knife 54 upward into the body 56.

Figure 7:
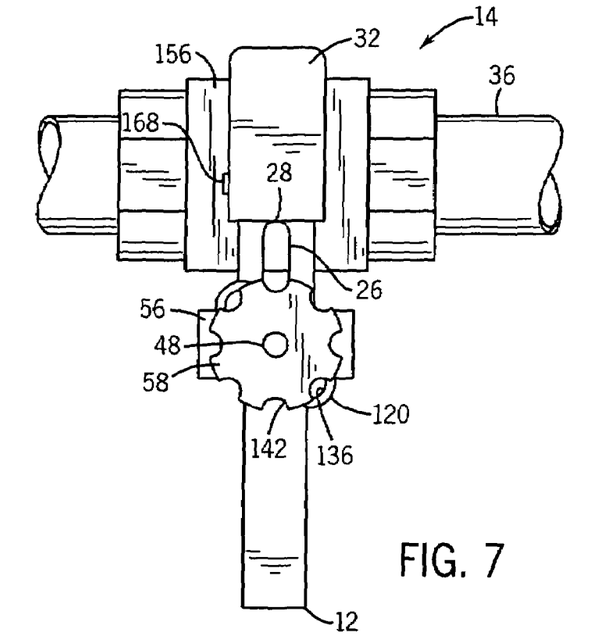
Figure 8:
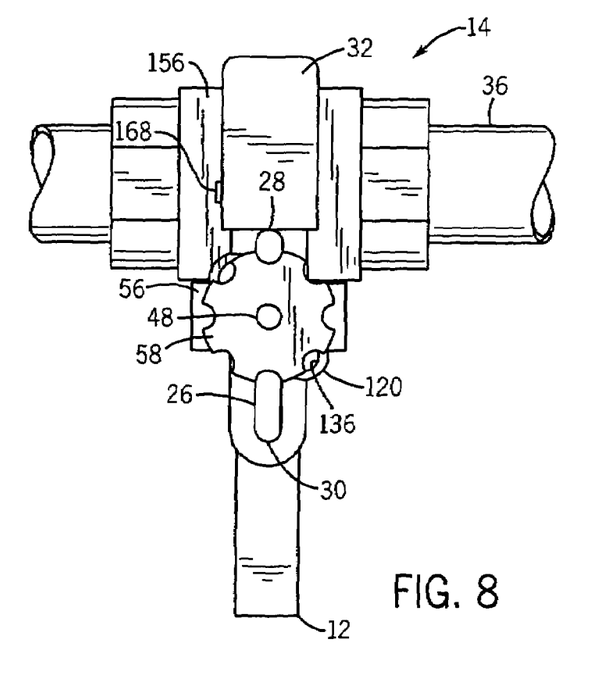

With reference to FIGS. 6–8, the valve lockout assembly 10 can be used with the valve 14 that has a housing 156 connected to the pipeline 36. The handle 12 of the valve 14 is coupled at one end 160 to valve stem 162 to enable the user to rotate the valve stem 162 and thus operate the valve 14 between the open and closed positions. The one end 160 of the handle 12 has a tab 164 which abuts a first stop 166 on the valve housing 156 when the valve 14 is in the fully closed position as illustrated in FIGS. 6–8. The valve housing 156 also has a second stop 168 which the handle tab 164 abuts when the valve 14 is in the fully open position.

With reference to FIGS. 1–6, in order to place the valve lockout assembly 10 onto the handle 12 of the valve 14, the user loosens the hand wheel 58 and rotates the clamping mechanism 18 relative to the lock arm 16, such that the lock arm 16 does not interfere with the handle 12 being slipped between the locking knife lower jaw 96 and body jaws 86. The user then pushes the hand wheel 58 into the locking cleat 60, causing the locking knife 54 to move away from the jaws 86 of the body 56. This creates an opening between the locking knife lower jaw 96 and the body 56 through which the handle 12 can be inserted. The handle 12 is then slipped laterally. i.e. over the distal end 102 of the locking knife lower jaw 96, between the lower jaw 96 of the locking knife 54 and the jaws 86 of the body 56. Once the lower jaw 96 of the locking knife 54 and the jaws 86 of the body 56 are disposed on opposing sides of the handle 12, such that the jaws 86, 96 can clamp onto the handle 12, the user releases the hand wheel 58 allowing the compression spring 150 to push the hand wheel 58 away from the locking cleat 60, causing the locking knife 54 to retract into the body 56 clamping the handle 12 between the lower jaw 96 of the locking knife 54 and the jaws 86 of the body 56.

The compression spring 150 forces the teeth 98 of lower jaw 96 against the handle 12 drawing the handle 12 against the jaws 86 of body 56. This biasing action provided by the compression spring 150 is sufficient to hold the valve lockout assembly 10 onto the handle 12 during further installation steps. However, the force exerted by the compression spring 150 is not sufficient to prevent the lock arm 16 from moving relative to the locking cleat 60 and the body 56. This allows the user to rotate and slide the lock arm 16, such that the threaded stud 48 moves between the slot ends 28, 30, relative to the clamping mechanism 18 until the projection 34 engages the valve housing 156, the pipeline 36, or other structure, such that the lock arm engagement end 22 is fixed relative to the pipeline 36.

The user then tightens the hand wheel 58 which pulls upwardly on the threaded stud 48 to force the locking cleat 60 against the lock arm 16. This action also presses the lock arm 16 against the body 56. When the hand wheel 58 is fully tightened, the locking ribs 128 of the locking cleat 60 engage the locking ribs 38 of the lock arm 16. The other locking ribs 40 of the lock arm 16 also engage the locking ribs 82 on the body 56. The locking ribs 40, 82 intermesh when the hand wheel 58 is fully tightened, thus preventing the lock arm 16 from moving relative to the body 56 and locking cleat 60.

The user completes the tightening of the hand wheel 58 by aligning one of the notches 142 with the aperture 136 in a tab 120 of the locking cleat 60. This orientation allows a locking mechanism, such as the shackle of a padlock 46 (shown in FIG. 6), to be inserted through the aperture 136 and locked on the tab 120. The shackle prevents the hand wheel 58 from being turned since the aligned notch 142 will strike the shackle if rotation is attempted. A second padlock may be inserted through the other tab 120 of the locking cleat 60, thus requiring two separate keys in order to remove both padlocks and operate the valve 14.

In the fully closed position of the valve 14, abutment of the handle tab 164 against the valve housing stop 166 prevents clockwise rotation of the handle 12. Thus the handle 12 must be rotated counterclockwise in order to open the valve 14. However, the valve lockout assembly 10, prevents counterclockwise rotation of the handle 12 and precludes unauthorized opening of the valve 14. Therefore, any attempt to rotate the handle 12 in the clockwise direction will be inhibited by the valve lockout assembly 10. Advantageously, with the body 56 tight against the valve housing 156 or pipeline 36, rotation of the handle 12 is difficult even if the projection 34 extending from the lock arm 16 does not engage a structure that can fix the lock arm 16 engagement end 22 relative to the pipeline 36 to prevent rotation of the handle 12.

A user who is authorized to operate the locked valve 14 can remove the padlock from the locking cleat 60, enabling the hand wheel 58 to be turned, releasing the force that holds the lock arm 16 between the locking cleat 60 and the body 56. This enables the valve lockout assembly 10 to be rotated to be removed from the handle 12 so that the handle 12 may be rotated toward the open position.

In another embodiment of the present invention shown in FIGS. 9–18, a lockout assembly 210 has a clamping mechanism 218, such as described above, with a cable lockout assembly 212 interposed between the locking cleat 260 and a lock arm 216. The cable lockout assembly 212 clamps onto a cable 214 which can be threaded through a valve to lock out the valve. Preferably, the cable 214 has an anchor end 222 with an anchor 224 fixed thereto and a free end 226. The anchor end 222 of the cable 214 is anchored to the cable lockout assembly 212 by the anchor 224. The free end 226 of the cable 214 can be slipped through the valve (not shown) and then fixed relative to the cable lockout assembly 212 to lock out the valve.

Figure 9:
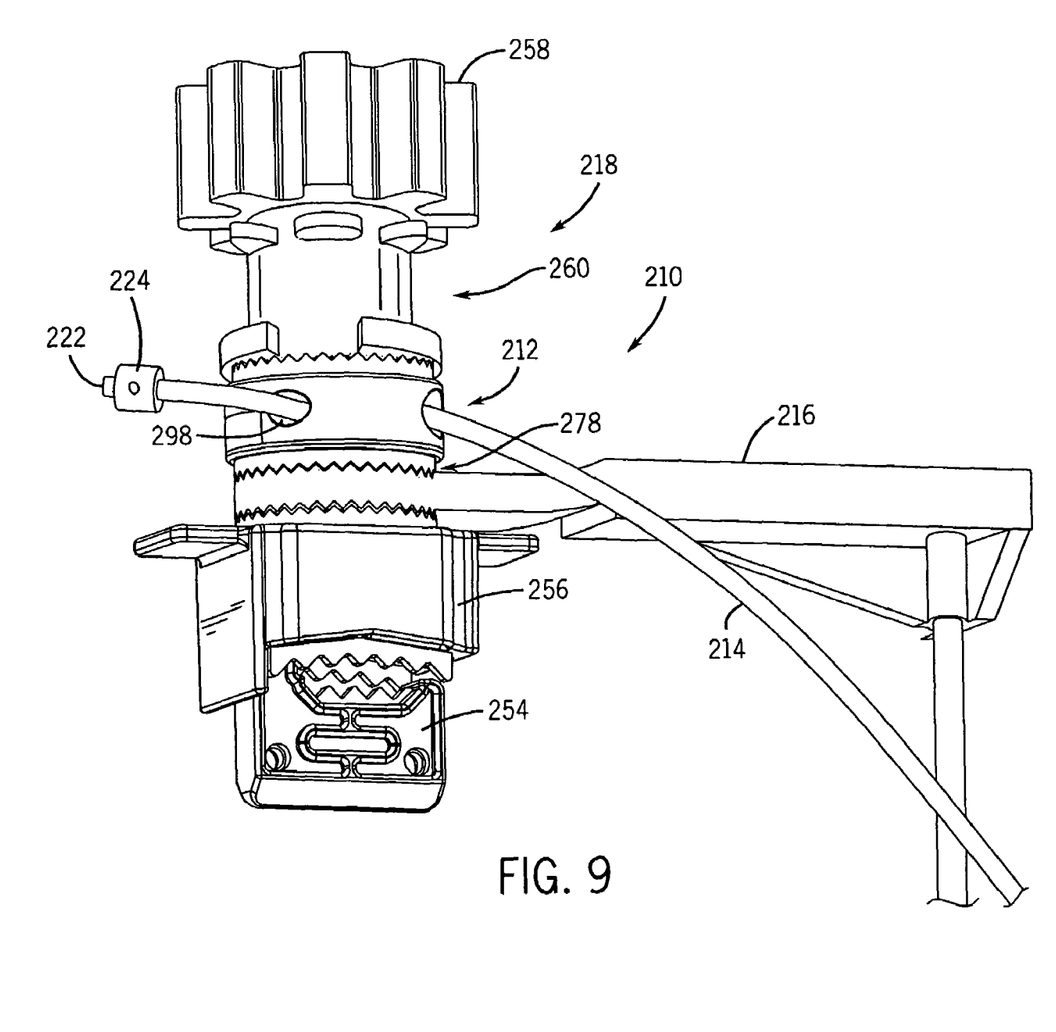
FIG. 9 is a bottom perspective view of another embodiment of a lockout assembly incorporating the present invention.
Figure 10:
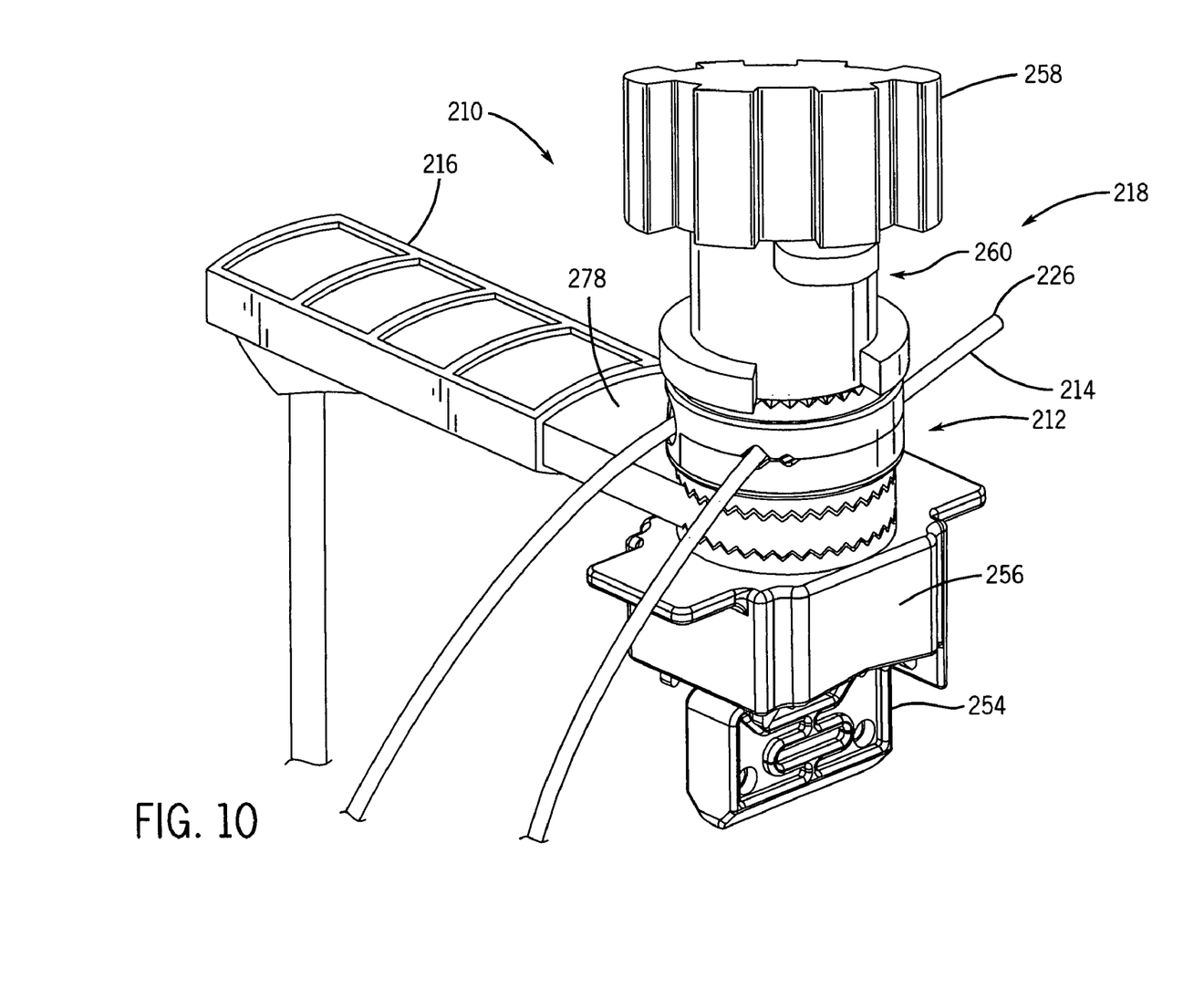
FIG. 10 is a top perspective view of the lockout assembly of FIG. 9.
Figure 11:
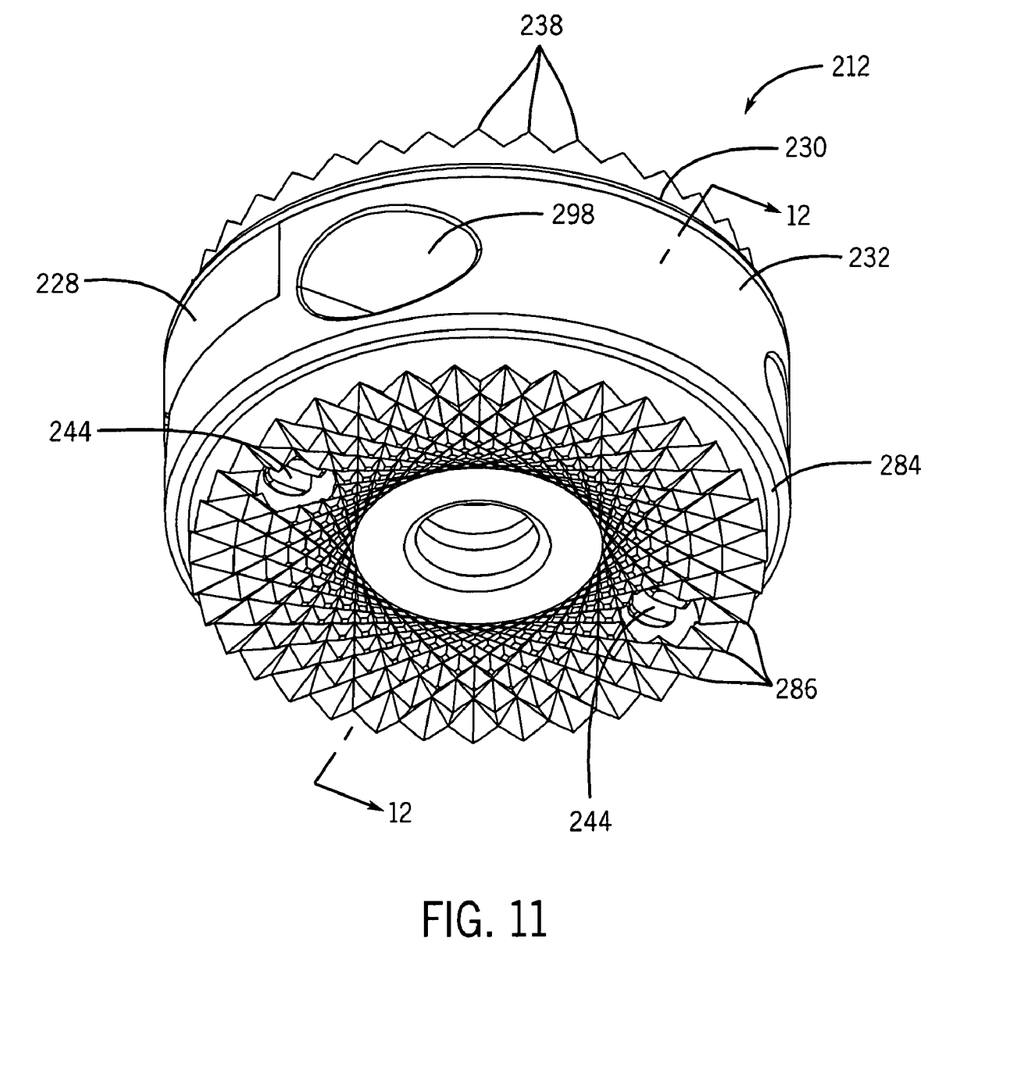
FIG. 11 is a bottom perspective view of the cable lockout assembly of FIG. 9.
Figure 12:
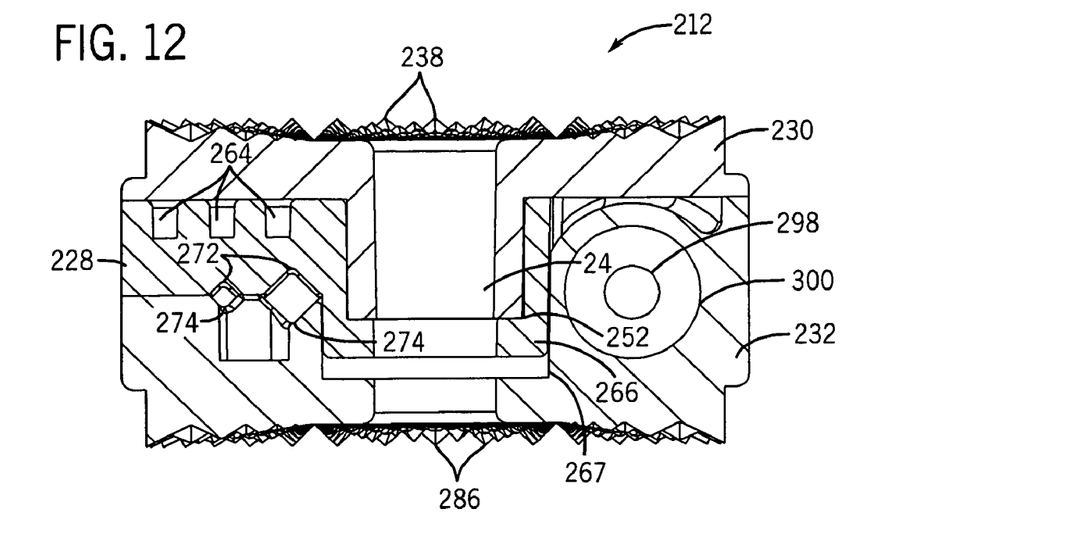
FIG. 12 is a cross sectional view bisecting the cable lockout assembly of FIG. 11.
Figure 13:
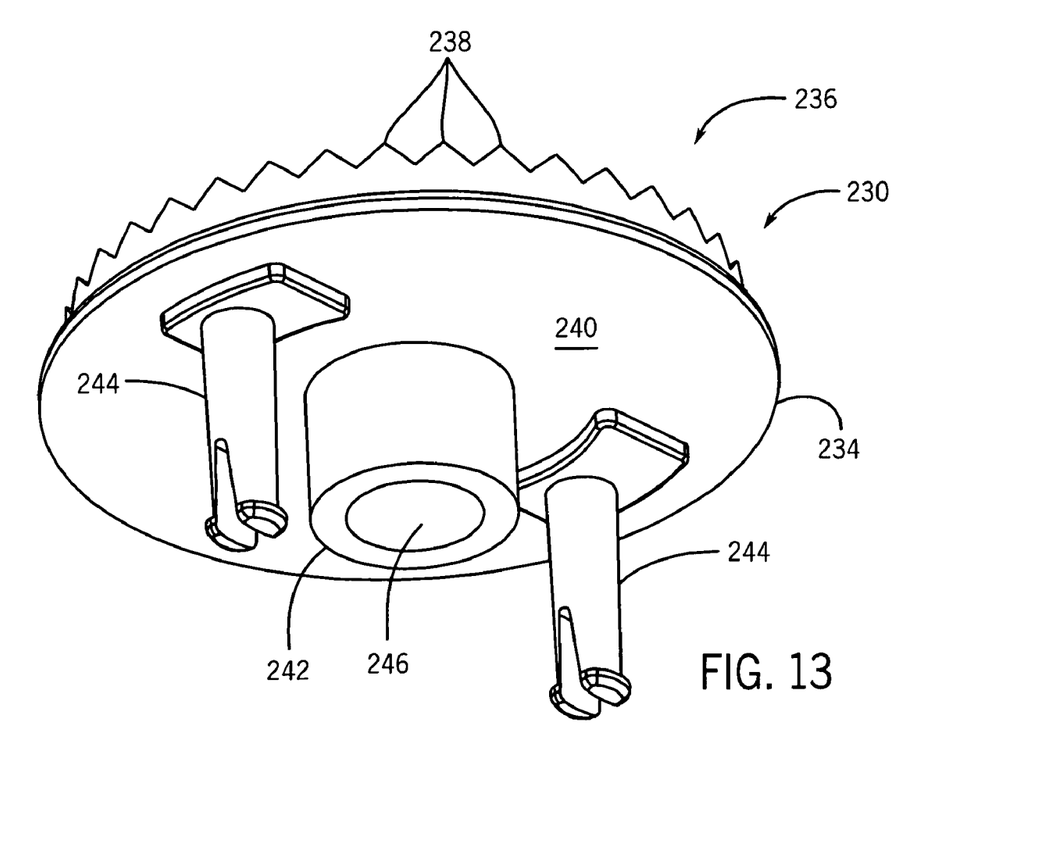
FIG. 13 is a bottom perspective view of the top member of the cable lockout assembly of FIG. 11.
Figure 14:
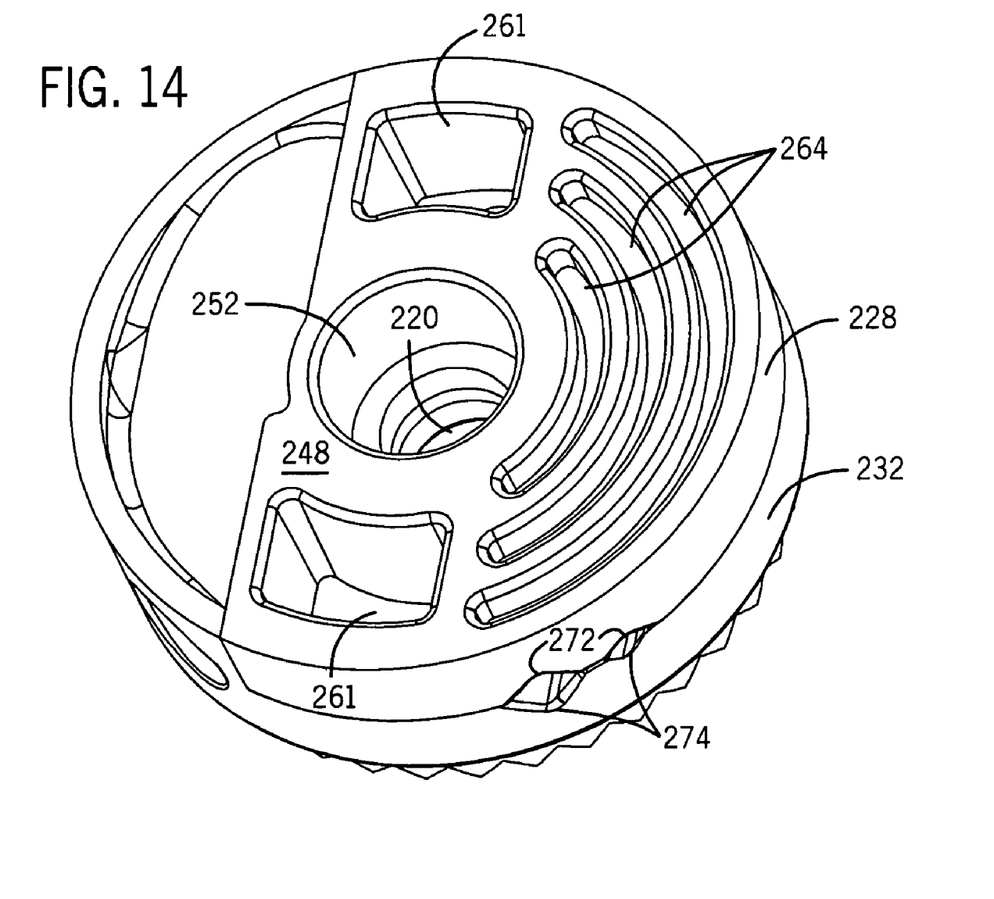
FIG. 14 is a top perspective view of the middle member of the cable lockout assembly of FIG. 11.
Figure 15:
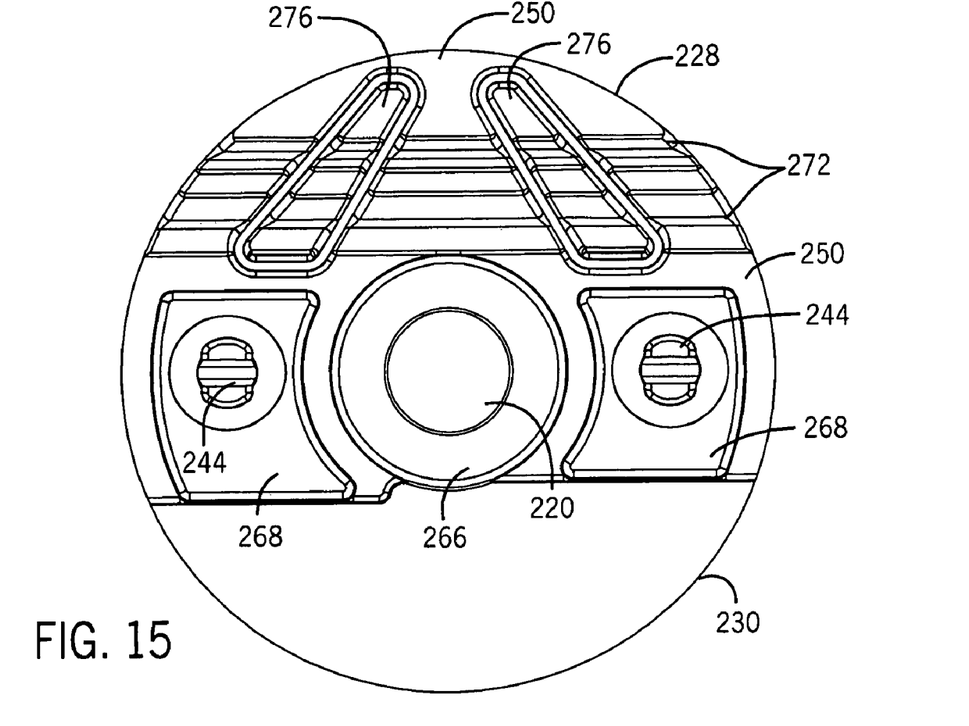
FIG. 15 is a bottom plan view of the middle and top members of the cable lockout assembly of FIG. 11.
Figure 16:
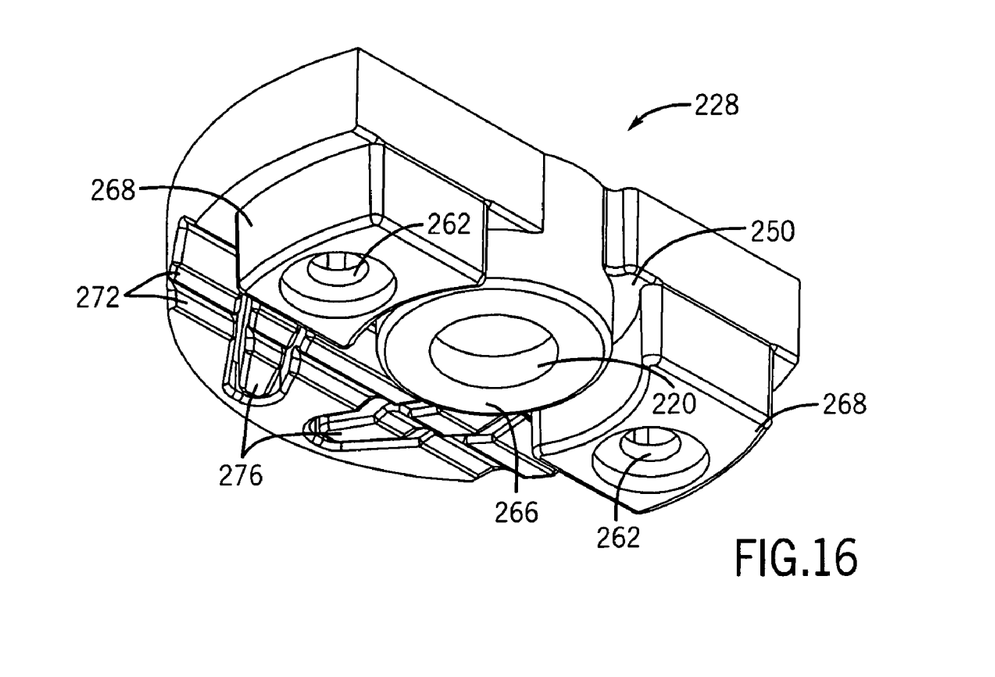
FIG. 16 is a bottom perspective view of the middle member of the cable lockout assembly of FIG. 11.
Figure 17:
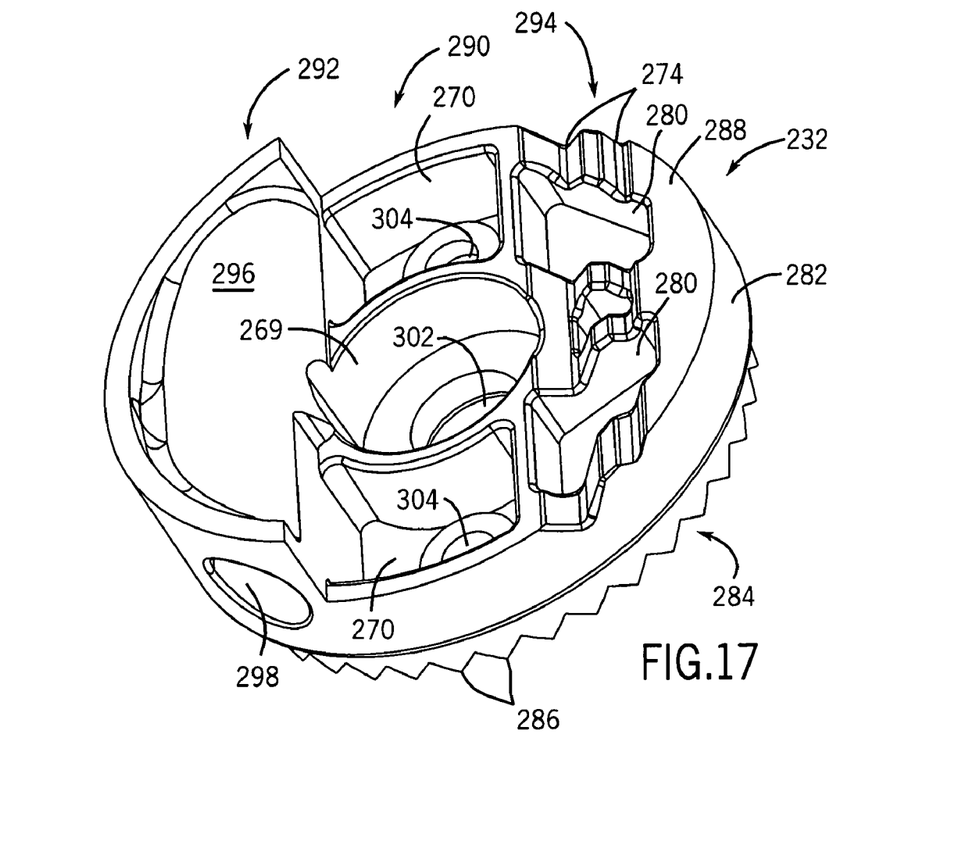
FIG. 17 is a top perspective view of the bottom member of the cable lockout assembly of FIG. 11.
Figure 18:
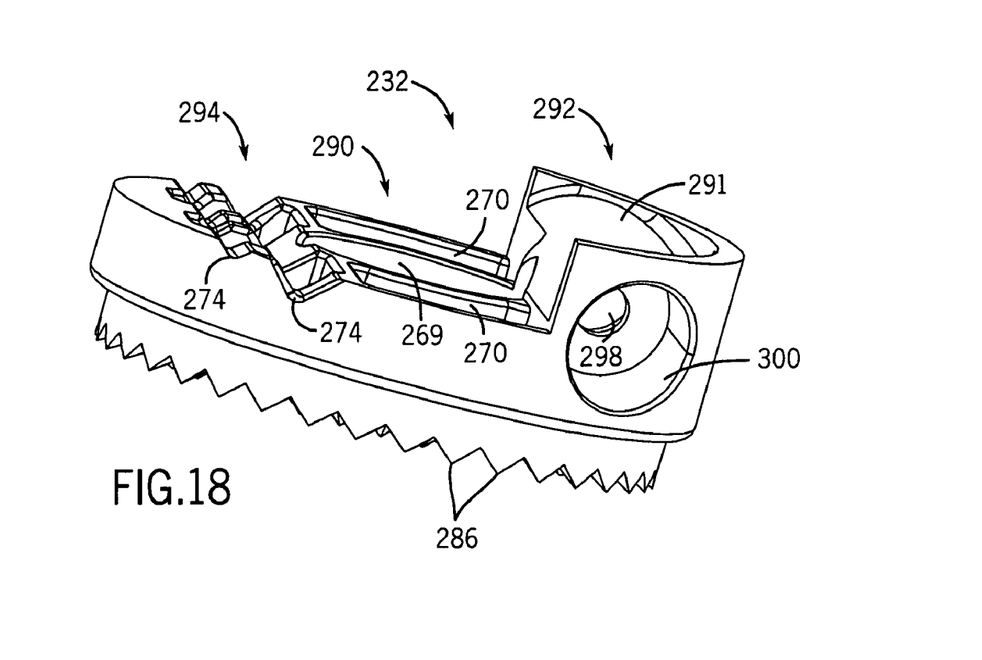
FIG. 18 is a top, side perspective view of the bottom member of the cable lockout assembly of FIG. 11.

As shown in FIGS. 9 and 10, the lockout assembly 210 includes the lock arm 216 supporting the clamping mechanism 218. The lock arm 216 can be any lock arm, such as the novel lock arm 16 described above, the lock arm disclosed in U.S. Pat. No. 5,415,017, and the like. The clamping mechanism 218, preferably includes a hand wheel 258 frictionally engageable with the locking cleat 260 and joined to a locking knife 254 by a threaded stud (not shown) that extends through the locking cleat 260 and a body 256, such as described above. In the embodiment disclosed in FIGS. 9–18, the threaded stud also extends through the cable lockout assembly 212.

Referring to FIGS. 9–12, the disc-shaped cable lockout assembly 212 is interposed between the locking cleat 260 and lock arm 216, and includes a middle member 228 interposed between a top member 230 and a bottom member 232. The middle member 228 and top member 230 cooperatively clamp onto the cable 214 therebetween to fix the free end 226 of the cable 214 relative to the cable lockout assembly 212 to lock out the valve. Preferably, the top, middle, and bottom members 230, 228, 232 are molded from a plastic material.

The top member 230 shown in FIGS. 9, 11–13 includes a disc 234 having a top surface 236 and bottom surface 240 forming the top surface of the cable lockout assembly 212. The top surface 236 of the disc 234 includes intersecting locking ribs 238 that engage locking ribs of the locking cleat 260. The bottom surface 240 of the disc 234 faces the middle and bottom members 228, 232, and includes a center guide annulus 242 between a pair of downwardly extending elongated fasteners 244. The center guide annulus 242 includes a center opening 246 for receiving the threaded stud therethrough. The fasteners 244 extend through the middle member 228 and resiliently engage the bottom member 232 to prevent the bottom member 232 from separating from the top member 230.

Referring to FIGS. 11, 12, and 14–16 the middle member 228 is interposed between the top and bottom members 230, 232, and includes a top surface 248 and a bottom surface 250. A center cavity 252 formed in the top surface 248 defines a center receptacle that receives the center guide annulus 242 of the top member 230. The center cavity 252 includes a center opening 220 that receives the threaded stud therethrough. Outer receptacles 261 formed on diametrically opposing sides of the center cavity 252 include openings 262 for receiving the fasteners 244 therethrough. Arcuate, or any other shaped, grooves 264 can be formed in the middle member top surface 248 to reduce the material content of the middle member 228 and save manufacturing costs.

Referring to FIGS. 11, 12, and 15–18 the bottom surface 250 of the middle member 228 has a center guide 266 extending downwardly that is received in a center receptacle 269 formed in the bottom member 232. Outer guides 268 diametrically opposed to the middle member center guide 266 and extending downwardly from the middle member bottom surface 250 are received in outer receptacles 270 formed in the bottom member 232. Transverse grooves 272 formed in the middle member bottom surface 250 facing transverse grooves 274 formed in the bottom member 232 guide the cable 214 across a pair of grooved teeth 276 formed crossing the middle member transverse grooves 272. The grooved teeth 276 extend downwardly slightly past the bottom surface 250 to urge the cable 214 into teeth receptacles formed in the bottom member 232 to trap the cable 214 between the middle and bottom members 228, 232.

The bottom member 232 shown in FIGS. 9–12, 14, 15, 17, and 18 includes a disc 282 having a bottom surface 284 forming the bottom surface of the cable lockout assembly 212. The bottom surface 284 of the bottom member 232 includes intersecting locking ribs 286 that engage the locking ribs 238 of the lock arm top surface 278. A top surface 288 of the disc 282 faces the middle and top member 228, 230, and is divided into a center section 290 interposed between first and second outer sections 292, 294.

The first outer section 292 includes a cable end retention block 296 which extends upwardly from the disc 282 adjacent to the middle member 228. A transverse retention block throughhole 298 formed through the retention block 296 receives the cable 214 therethrough. A receptacle 300 formed at one end of the retention block throughhole 298 receives the anchor 224 attached to the anchor end 222 of the cable 214 to anchor the anchor end 222 of the cable 214 to the bottom member 232.

The center section 290 includes circular center receptacle 269 and the two outer receptacles 270. The center receptacle 269 slidably receives the center guide 266 extending downwardly from the middle member 228, and includes a center aperture 302 formed through the disc 282 through which the threaded stud extends. The outer receptacles 270 slidably receive the outer guides 268 extending upwardly from the middle member 228. An aperture 304 formed in each outer receptacle 270 through the disc 282 receives the fastener 244 extending from the top member 230 through the middle member outer guides 268.

The second outer section 294 includes the pair of teeth receptacles 280 for receiving the teeth 276 extending upwardly from the middle member 228. The transverse grooves 274 formed across the second outer section 294 across the teeth receptacles 280 are aligned with the grooves 272 formed in the middle member bottom surface 250 for guiding the cable 214 across the teeth 276.

In use, referring to FIGS. 9–12, the lockout assembly 210 is slipped onto a valve handle as described above for the first embodiment. Once the clamping mechanism 218 is slipped onto the valve handle, the cable free end 226 is slipped through the retention block throughhole 298, such that the anchor 224 fixed to the cable anchor end 222 is received in the anchor receptacle 300. The cable free end 226 is then slipped through the valve to lock out the valve, and then threaded between the middle member 228 and bottom member 232 of the cable lockout assembly 212. Preferably, the cable free end 226 is guided by the grooves 272, 274 formed in the middle member 228 and bottom member 232, as the cable free end 226 is threaded therebetween.

Once the cable free end 226 is threaded between the middle member 228 and bottom member 232, the clamping mechanism 218 is secured to the valve handle, as described above for the first embodiment. Advantageously, as the user tightens the hand wheel 258, the locking cleat 260 urges the top, middle, and bottom members 230, 228, 232 of the cable lockout assembly 212 together to lock the cable 214 between the middle member 228 and bottom member 232 of the cable lockout assembly 212. The user completes the tightening of the hand wheel 258 and locks the hand wheel 258 as described above for the first embodiment to prevent the hand wheel 258 from being turned to release the cable 214 and unlock the valve.

While there has been shown and described what are at present considered the preferred embodiments of the invention, it will be obvious to those skilled in the art that various changes and modifications can be made therein without departing from the scope of the invention defined by the appended claims.

I claim:

1. A lockout assembly suitable for use with a valve having a handle rotatable between an open position and a closed position, said assembly comprising:
    a lock arm including a longitudinal slot having slot ends; and
    a clamping mechanism engagable with the handle for clamping thereto, and including a threaded stud extending through said slot, said threaded stud being slidable in said slot between said slot ends, wherein said clamping mechanism includes a locking knife and body, said body being interposed between said lock arm and locking knife and including an opening for slidably receiving said threaded stud therethrough, said locking knife being axially fixed to an end of said threaded stud and moveable relative to said body for clamping onto the handle interposed between said locking knife and body.

2. The lockout assembly as in claim 1, in which said locking knife includes a lower jaw having a distal end and a proximal end, said proximal end being connected to said threaded stud by a sidearm offset from an axis defined by said threaded stud to allow the handle to slip between said lower jaw and body over said distal end of said lower jaw.

3. The lockout assembly as in claim 1, in which said body slidably receives said locking knife in a cavity formed in said body.

4. A lockout assembly suitable for use with a valve having a handle rotatable between an open position and a closed position, said assembly comprising:
    a lock arm including a longitudinal slot having slot ends;
    a clamping mechanism engagable with the handle for clamping thereto, and including a threaded stud extending through said slot, said threaded stud being slidable in said slot between said slot ends; and
    a hand wheel threadably engaging said threaded stud, wherein rotation of said hand wheel axially moves said threaded stud to engage and disengage said clamping assembly from the handle.

5. The lockout assembly as in claim 4, in which said hand wheel is engagable with a locking mechanism to prevent rotation of said hand wheel.

6. The lockout assembly as in claim 5, in which a locking cleat interposed between said hand wheel and said lock arm includes a first opening for slidably receiving said threaded stud therethrough, said locking cleat including a second opening for receiving the locking mechanism relative to said valve lockout assembly to prevent rotation of said hand wheel.

7. The lockout assembly as in claim 6, in which said first and second openings are circular.

8. The lockout assembly as in claim 6, in which said locking cleat is moveable relative to said lock arm with said threaded stud as said threaded stud moves in said slot between said slot ends.

9. The lockout assembly as in claim 6, in which a cable lockout assembly is interposed between said locking cleat and said lock arm.

10. A lockout assembly suitable for use with a valve having a handle rotatable between an open position and a closed position, said assembly comprising:
    a lock arm including a longitudinal slot having slot ends, said lock arm including a projection engagable with said valve; and
    a clamping mechanism engagable with the handle for clamping thereto, and including a threaded stud extending through said slot, said threaded stud being slidable in said slot between said slot ends.

11. A lockout assembly suitable for use with a valve having a handle rotatable between an open position and a closed position, said assembly comprising:
    a clamping mechanism engagable with the handle for clamping thereto, and including a threaded stud, a locking knife, and a body, said body including an opening for slidably receiving said threaded stud therethrough, said locking knife being axially fixed to an end of said threaded stud and being moveable relative to said body for clamping onto the handle interposed between said locking knife and said body, said locking knife including a lower jaw having a distal end and a proximal end, said proximal end being connected to said threaded stud by a sidearm offset from an axis defined by said threaded stud to allow the handle to slip between said lower jaw and said body over said distal end of said lower jaw.

12. The lockout assembly as in claim 11, including a lock arm having an opening through which said threaded stud extends, and said body being interposed between said lock arm and said locking knife.

13. The lockout assembly as in claim 12, in which said lock arm opening is a longitudinal slot having slot ends, and said threaded stud is slidable in said slot between said slot ends.

14. The lockout assembly as in claim 11, in which said body slidably receives said locking knife in a cavity formed in said body.

15. The lockout assembly as in claim 11, in which a hand wheel threadably engages said threaded stud, wherein rotation of said hand wheel axially moves said threaded stud to engage and disengage said clamping assembly from the handle.

16. The lockout assembly as in claim 15, in which said hand wheel is engagable with a locking mechanism to prevent rotation of said hand wheel.

17. The lockout assembly as in claim 16, in which a locking cleat interposed between said hand wheel and said locking knife includes a first opening for slidably receiving said threaded stud therethrough, said locking cleat including a second opening for receiving the locking mechanism relative to said valve lockout assembly to prevent rotation of said hand wheel.

18. The lockout assembly as in claim 17, in which said first and second openings are circular.

19. The lockout assembly as in claim 17, including a lock arm having an opening through which said threaded stud extends, said opening being a longitudinal slot having slot ends, and said locking cleat is moveable relative to said lock arm with said threaded stud as said threaded stud moves in said slot between said slot ends.

20. The lockout assembly as in claim 17, in which a cable lockout assembly is interposed between said locking cleat and said body.

21. The lockout assembly as in claim 12, in which said lock arm includes a projection engagable with said valve.

22. A lockout assembly suitable for use with a valve having a handle rotatable between an open position and a closed position, said assembly comprising:
   a lock arm including a longitudinal slot having slot ends; and
   a clamping mechanism engagable with the handle for clamping thereto, and including a threaded stud extending through said slot, said threaded stud being slidable in said slot between said slot ends, said clamping mechanism including a locking knife and body, said body being interposed between said lock arm and locking knife and including an opening for slidably receiving said threaded stud therethrough, said locking knife being axially fixed to an end of said threaded stud and being moveable relative to said body for clamping onto the handle interposed between said locking knife and said body, said locking knife including a lower jaw having a distal end and a proximal end, said proximal end being connected to said threaded stud by a sidearm offset from an axis defined by said threaded stud to allow the handle to slip between said lower jaw and said body over said distal end of said lower jaw.

23. The valve lockout assembly as in claim 22, in which a cable lockout assembly is interposed between a locking cleat and said body.

24. A lockout assembly suitable for use with a valve having a handle rotatable between an open position and a closed position, said assembly comprising:
   a lock arm including an opening and a projection engagable with said valve; and
   a clamping mechanism engagable with the handle for clamping thereto, and including a threaded stud and a cable lockout assembly, said threaded stud extending through said opening and said cable lockout assembly.

25. The valve lockout assembly as in claim 24, in which said lock arm opening is a longitudinal slot having slot ends, and said threaded stud is slidable in said slot between said slot ends.

26. The valve lockout assembly as in claim 24, in which said clamping mechanism includes a locking knife and body, said body being interposed between said lock arm and locking knife and including an opening for slidably receiving said threaded stud therethrough, said locking knife being axially fixed to an end of said threaded stud and moveable relative to said body for clamping onto the handle interposed between said locking knife and body.

27. The valve lockout assembly as in claim 26, in which said locking knife includes a lower jaw having a distal end and a proximal end, said proximal end being connected to said threaded stud by a sidearm offset from an axis defined by said threaded stud to allow the handle to slip between said lower jaw and said body over said distal end of said lower jaw.

28. A clamping mechanism suitable for use with a valve having a handle rotatable between an open position and a closed position, said mechanism comprising:
   a threaded stud;
   a body including an opening for slidably receiving said threaded stud therethrough; and
   a locking knife axially fixed to an end of said threaded stud; and being moveable relative to said body for clamping onto the handle interposed between said locking knife and said body, said locking knife including a lower jaw having a distal end and a proximal end, said proximal end being connected to said threaded stud by a sidearm offset from an axis defined by said threaded stud to allow the handle to slip between said lower jaw and said body over said distal end of said lower jaw.

29. The clamping mechanism as in claim 28, in which a lock arm having an opening through which said threaded stud extends, and said body is interposed between said lock arm and said locking knife.

30. The clamping mechanism as in claim 29, in which said lock arm opening is a longitudinal slot having slot ends, and said threaded stud is slidable in said slot between said slot ends.

31. The clamping mechanism as in claim 28, in which said body slidably receives said locking knife in a cavity formed in said body.

32. The clamping mechanism as in claim 28, in which a hand wheel threadably engages said threaded stud, wherein rotation of said hand wheel axially moves said threaded stud to engage and disengage said clamping assembly from the handle.

33. The clamping mechanism as in claim 32, in which said hand wheel is engagable with a locking mechanism to prevent rotation of said hand wheel.

34. The clamping mechanism as in claim 33, in which a locking cleat interposed between said hand wheel and said locking knife includes a first opening for slidably receiving said threaded stud therethrough, said locking cleat including a second opening for receiving the locking mechanism relative to said valve lockout assembly to prevent rotation of said hand wheel.

35. The clamping mechanism as in claim 34, in which said first and second openings are circular.

36. The clamping mechanism as in claim 34, including a lock arm having an opening through which said threaded stud extends, said opening being a longitudinal slot having slot ends, and said locking cleat is moveable relative to said lock arm with said threaded stud as said threaded stud moves in said slot between said slot ends.

37. The clamping mechanism as in claim 34, in which a cable lockout assembly is interposed between said locking cleat and said body.

38. The clamping mechanism as in claim 29, in which said lock arm includes a projection engagable with said valve.

* * * * *